US008926434B2

(12) United States Patent
Merati et al.

(10) Patent No.: US 8,926,434 B2
(45) Date of Patent: Jan. 6, 2015

(54) SERVER-BASED GAMING SYSTEM AND METHOD UTILIZING UNIQUE MEMORY ENVIRONMENTS (75) Inventors: Bruce Merati, San Diego, CA (US); Roger H. Goeb, Las Vegas, NV (US); Darrell Wesley Buck, Long Beach, CA (US)

(73) Assignee: Next Gaming, LLC., Las Vegas, NV (US)

( * ) Notice: Subject to any disclaimer, the term of this patent is extended or adjusted under 35 U.S.C. 154(b) by 1426 days.

(21) Appl. No.: 12/267,482

(22) Filed: Nov. 7, 2008

(65) Prior Publication Data
US 2010/0122320 A1 May 13, 2010

(51) Int. Cl.
| | |
|---|---|
| G06F 17/00 | (2006.01) |
| G06F 19/00 | (2011.01) |
| G06F 1/02 | (2006.01) |
| G06F 7/58 | (2006.01) |
| H04L 29/06 | (2006.01) |
| H04L 9/00 | (2006.01) |
| H04L 9/08 | (2006.01) |
| H04L 9/32 | (2006.01) |
| H04L 29/12 | (2006.01) |

(52) U.S. Cl.
CPC ............... *H04L 63/08* (2013.01); *H04L 9/006* (2013.01); *H04L 9/0822* (2013.01); *H04L 9/3271* (2013.01); *H04L 63/166* (2013.01); *G06F 2221/2109* (2013.01); *H04L 29/12839* (2013.01); *H04L 61/6022* (2013.01)
USPC ........................................... 463/42; 708/250

(58) Field of Classification Search
USPC .............. 463/16–25, 39–43, 29–31; 708/250, 708/253, 254, 256; 380/251
See application file for complete search history.

(56) References Cited

U.S. PATENT DOCUMENTS

| | | | | |
|---|---|---|---|---|
| 5,779,545 | A | * | 7/1998 | Berg et al. ...................... 463/22 |
| 6,117,013 | A | * | 9/2000 | Eiba ................................ 463/41 |
| 6,508,709 | B1 | * | 1/2003 | Karmarkar ...................... 463/42 |
| 6,749,510 | B2 | * | 6/2004 | Giobbi ............................. 463/42 |
| 6,988,946 | B2 | * | 1/2006 | Michaelson et al. ........... 463/17 |
| 8,764,566 | B2 | * | 7/2014 | Miltenberger et al. ......... 463/42 |
| 2003/0028567 | A1 | * | 2/2003 | Carlson ......................... 708/250 |
| 2003/0130029 | A1 | * | 7/2003 | Crumby ......................... 463/20 |
| 2003/0157980 | A1 | * | 8/2003 | Loose et al. .................... 463/20 |
| 2004/0166942 | A1 | * | 8/2004 | Muir ............................... 463/43 |
| 2005/0054445 | A1 | * | 3/2005 | Gatto et al. ..................... 463/42 |
| 2005/0143166 | A1 | * | 6/2005 | Walker et al. .................. 463/25 |
| 2005/0148385 | A1 | * | 7/2005 | Michaelson .................... 463/21 |
| 2005/0221898 | A1 | * | 10/2005 | Gatto et al. ..................... 463/42 |
| 2006/0020648 | A1 | * | 1/2006 | Merati et al. ................. 708/250 |

(Continued)

*Primary Examiner* — Milap Shah
(74) *Attorney, Agent, or Firm* — Thibault Patent Group (57) ABSTRACT Among other things, systems and techniques are described for authenticating one or more client devices. A system includes one or more client devices and a server to communicate with the one or more client devices over a network. The server receives a request for network connection from at least one of the client devices. In response to the received request, the server performs authentication of the requesting client device based on at least two factors. The at least two factors includes a transmission control protocol (TCP) header verification to identify a media access control (MAC) address of the requesting client device as an authorized or unauthorized MAC address; and a challenge-reply verification performed based on the TCP header verification. The challenge-reply verification includes sending a challenge message sent to the requesting client device; receiving a reply message from the requesting client device; and identifying the received reply message as a correct or incorrect reply.

10 Claims, 9 Drawing Sheets

(56) References Cited

U.S. PATENT DOCUMENTS

| | | |
|---|---|---|
| 2006/0025199 A1* | 2/2006 | Harkins et al. ............... 463/19 |
| 2007/0021191 A1* | 1/2007 | White et al. ................. 463/25 |
| 2007/0072677 A1* | 3/2007 | Lavoie et al. ................ 463/42 |
| 2007/0155507 A1* | 7/2007 | Gatto et al. ................. 463/42 |
| 2008/0098226 A1* | 4/2008 | Zokumasui ................... 713/171 |
| 2008/0268947 A1* | 10/2008 | Fyock et al. ................ 463/29 |
| 2010/0291907 A1* | 11/2010 | MacNaughtan et al. ... 455/414.1 |

* cited by examiner

SERVER-BASED GAMING SYSTEM AND METHOD UTILIZING UNIQUE MEMORY ENVIRONMENTS

TECHNICAL FIELD

The subject matter described herein relates to a gaming network.

BACKGROUND

For a stand-alone slot machine found in today's casino floor, the necessary random number generator and games rules are stored in a computer board that reside within the machine. Also, the stand-alone slot machine is hardware oriented with only one game (or one set of games) residing within the computer board of the machine. To change a slot machine's game title, either the entire machine or the computer board or chip inside the machine need to be changed.

SUMMARY

Techniques and system are described for implementing a secure and self-monitoring slot gaming network.

In one aspect, a system includes one or more client devices and a server to communicate with the one or more client devices over a network. The service receives a request for network connection from at least one of the one or more client device, and in response to the received request, perform authentication of the requesting client device based on at least two factors. The at least two factors includes a transmission control protocol (TCP) header verification to identify a media access control (MAC) address of the requesting client device as an authorized or unauthorized MAC address, and based on the TCP header verification, a challenge-reply verification. The challenge-reply verification includes a sending a challenge message to the requesting client device, receiving a reply message from the requesting client device, and identifying the received reply message as a correct or incorrect reply.

Implementations can optionally include one or more of the following features. The server can perform the challenge-reply verification when the MAC address of the requesting client device is identified as an authorized MAC address. The challenge message sent to the requesting client can include a challenge string generated by combining one or more words and one or more numbers. The challenge string can include a combination of at least three words and at least one number. The reply message received from the requesting client can include a reply string of N characters, wherein N is greater than 1. The server can identify the received reply message as a correct or incorrect reply including modify the challenge string; select M characters from the modified challenge string, wherein M is greater than 1; compare the selected M characters with the received N characters of the reply string; and when the selected M characters match the received N characters, identify the received reply message as the correct reply, and authenticate the requesting client device. The modified challenge string can include a hash string of L characters generated based on the challenge string, wherein L is greater than 1. The server can generate the hash string using secure hash algorithm-1 (SHA-1). The selected M characters can include characters selected based on an offset table.

In another aspect, a method includes at a server, receiving a request for network connection from at least one of the one or more client device. Also, at the server, in response to the received request, authentication of the requesting client device is performed. The authentication includes verifying a transmission control protocol (TCP) header to identify a media access control (MAC) address of the requesting client device as an authorized or unauthorized MAC address, and based on the TCP header verification, performing challenge-reply verification. The challenge-reply verification includes sending a challenge message sent to the requesting client device, receiving a reply message from the requesting client device, and identifying the received reply message as a correct or incorrect reply.

Implementations can optionally include one or more of the following features. Performing the challenge-reply verification based on the TCP header verification can include performing the challenge-reply verification when the MAC address of the requesting client device is identified as an authorized MAC address. Sending the challenge message to the requesting client can include sending the challenge string generated by combining one or more words and one or more numbers. Sending the challenge message to the requesting client can include sending the challenge string generated by combination at least three words and at least one number. Receiving the reply message can include receiving a reply string of N characters, wherein N is greater than 1. Identifying the received reply message as a correct or incorrect reply can include modifying the challenge string; selecting M characters from the modified challenge string, wherein M is greater than 1; comparing the selected M characters with the received N characters of the reply string; and when the selected M characters match the received N characters, identifying the received reply message as the correct reply, and authenticating the requesting client device. Modifying the challenge string can include generating a hash string of L characters based on the challenge string, wherein L is greater than 1. Generating the hash string can include generating the hash string of L characters using secure hash algorithm-1 (SHA-1). Selecting the M characters can include selecting the M characters based on an offset table.

In another aspect, a server includes a memory unit to store a master file that includes information indicative of files stored in the memory unit of the server. The server includes a processor to communicate with the memory unit to verify integrity of the stored master file. The master file includes an encrypted and encoded file generated based on at least two encryption keys and one encoding scheme.

Implementations can optionally include one or more of the following features. The information indicative of files stored in the memory unit can include at least one of a list of files stored in the memory unit; a path of each file; md5sum of each file; a timestamp of each file; and file attributes of each file. The encrypted and encoded file can include a file generated based on an encryption of the master file using an encryption key, another encryption of the encrypted master file using another encryption key, and encoding of the encrypted file. The encryption key can include a public key infrastructure (PKI) encryption key and the other encryption key can include a twofish encryption key.

In another aspect, a method includes at a server, encrypting a master file that includes information indicative of files stored in the server. Encrypting the master file can include encrypting the master file using an encryption key, and encrypting the encryption key using another encryption key. Also, the encrypted master file is encoded.

Implementations can optionally include one or more of the following features. The encryption key can include a public key infrastructure (PKI) encryption key and the other encryption key can include a twofish encryption key. At a server, integrity of an encrypted master file that includes information indicative of files stored in the server can be authenticated. Authenticating the integrity can include reading two encryption keys from memory; decoding one of the encryption keys; decrypting the other encryption key using the decoded encryption key; reading the encrypted master file from memory; and decrypting the encrypted master filed using the decrypted encryption key. Decoding one of the encryption keys can include base64 decoding of a public key infrastructure (PKI) encryption key. Decrypting the other encryption key can include decrypting the other encryption key using the decoded PKI encryption key. Decrypting the encrypted master file can include decrypting the encrypted master file using the decrypted encryption key that includes a twofish encryption key. In addition, the decrypted master file can be searched for an embedded token that indicates a valid decryption; and based on the searching, a validity of the decryption can be determined. When the embedded token is found, each file listed in the decrypted master file can be checked to detect whether the checked file has been changed. When the checked file is detected to have changed, the method can include identifying whether the changed file is a critical file that should not be changed.

In another aspect, a system includes one or more client devices; and a server to communicate with the one or more client devices. The server includes a memory unit to store a random number generator and one or more game applications selectably accessible by the one or more client devices.

Implementations can optionally include one or more of the following features. The random number generator can assign a memory environment to each client device. The memory environment can include seed values used by the random number generator to generate random numbers for each client device. The random number generator can periodically update the generated plurality of random numbers for each client device at a rate of Y updates per second, wherein Y is greater than 1. The random number generator can regulate the update rate including setting an upper rate and a lower rate for updating the random numbers based at least on data processing capability of each client device; and modifying the update rate to stay within a range defined by the upper rate and the lower rate. The random number generator can regulate the update rate including setting a target rate based at least on data processing capability of each client device; and modifying the update rate to stay at or near the target rate. The server can provide the plurality of game applications to the one or more client devices in response to a request for the game applications.

In another aspect, a method includes at a server, receiving a communication request from one or more client devices. In response to the received communication request, a memory environment is assigned to each client device, and a selection of one or more game applications selectably accessible by the one or more client devices is provided.

Implementations can optionally include one or more of the following features. Assigning the memory environment can include assigning seed values used to generate random numbers for each client device. The generated random numbers can be periodically updated for each client device at a rate of Y updates per second, wherein Y is greater than 1. The update rate can be regulated including setting an upper rate and a lower rate for updating the random numbers based at least on data processing capability of each client device, and modifying the update rate to stay within a range defined by the upper rate and the lower rate. Regulating the update rate can include setting a target rate based at least on data processing capability of each client device, and modifying the update rate to stay at or near the target rate.

In another aspect, a system includes a server and one or more slot machines to communicate with the server, wherein each slot machine includes a set of reels that spins in response to a user input, and wherein each slot machine is designed to operate a slot game selected from the server in response to a user input and generate a record that includes information indicative of each game outcome for the selected slot game, wherein each game outcome includes a single spin of the set of reels.

Implementations can optionally include one or more of the following features. Each slot machine can transmit the generated record to the server in real-time. The server can receive the transmitted record; and process the received record in real-time to obtain real-time status of each slot machine.

In another aspect, a method includes at one or more slot machines, communicating with a server to select a slot game to operate in response to a user input. Also, at the slot machine, generating a record that includes information indicative of each game outcome for the selected slot game, wherein each game outcome includes a single spin of a set of reels.

Implementations can include one or more of the following features. The generated record can be transmitted to the server in real-time. At the server, the transmitted record can be received. Also, the received record can be processed in real-time to obtain real-time status of each slot machine.

The subject matter of this disclosure can be implemented as computer program products, tangibly embodied in a computer or machine readable medium. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

Further, features described in this specification can be implemented as one or more methods or processes.

The subject matter described herein provides many advantages. For example, the techniques and system described in this specification can be implemented to provide a slot machine that behaves as a client device of a game server. Instead of the slot machine, the game server holds the random number generator and the game rules that perform the win/loss determination.

In addition, casinos would not need to have as many slot machines on their casino floors as they have today because a participant can play many different games available on a central server from the same machine. Also, moving control of a game to a central location (e.g., on a central server) has additional benefits such as a comprehensive real time database management for player tracking, player rewards and other player interactions such as target advertising and interactive communications.

Currently, slot machines are networked through an external system to provide a casino-wide accounting system only. However, the techniques and systems described in this specification can be implemented to record all transactions on real time basis in a game server database. Such game server database provides a more comprehensive solution to the casinos. For example, the data stored on our game server can provide more detailed slot accounting than the current external systems as well as real time marketing tools that were not previously available through a stand-alone or server-supported slot machine designs.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Techniques and systems are described for implementing a secured and self-monitoring slot gaming network.

Figure 1:
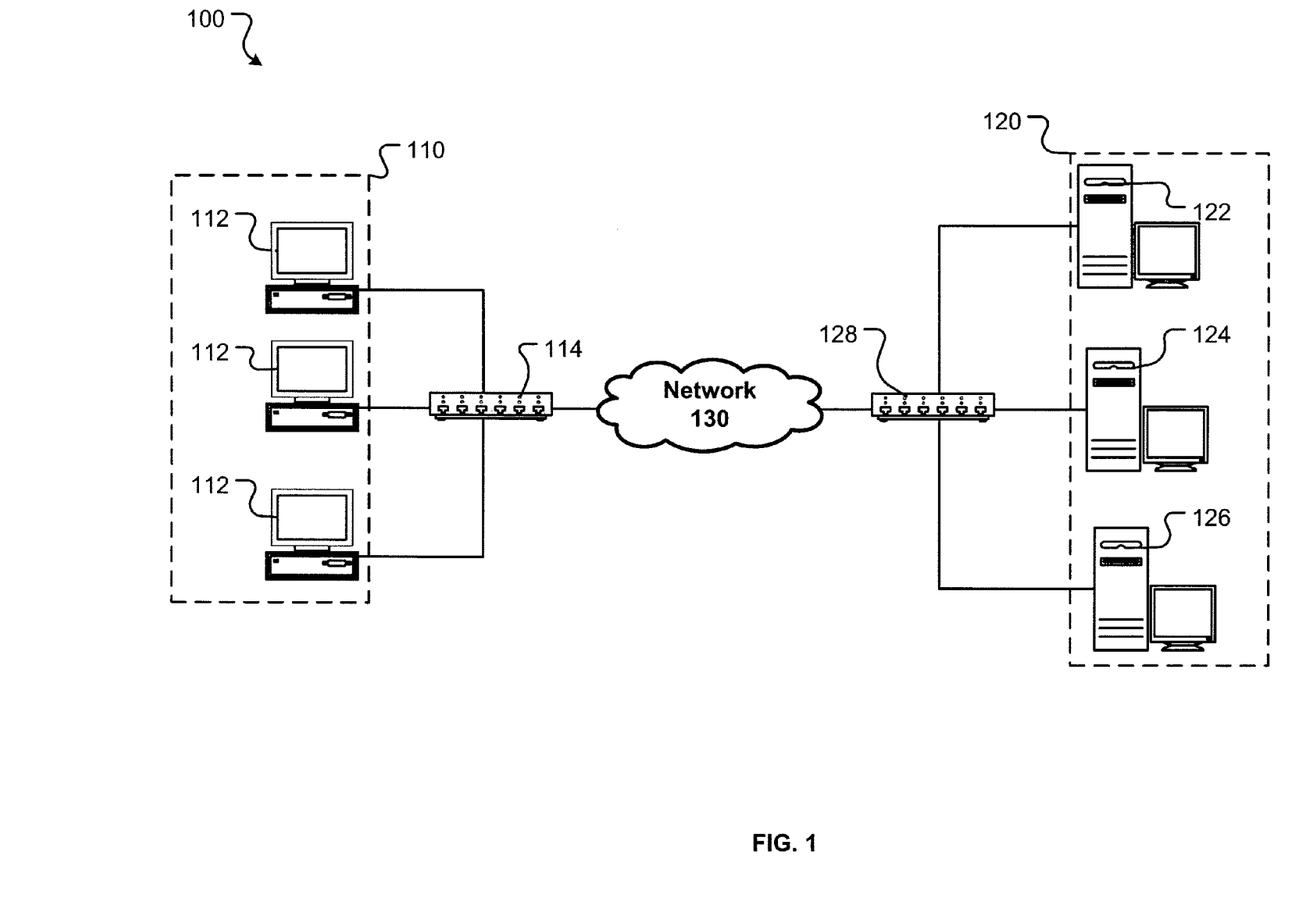
FIG. 1 is a block diagram showing an example system for providing a secured and self-monitoring slot gaming network.

FIG. 1 is a block diagram showing an example system 100 for providing a secured and self-monitoring slot gaming network. The system 100 includes a client system 110 to communicate with a server system 120 over a communication network 130. The client system 110 includes multiple client devices 112 that can be linked to the communication network 130 using a switching or routing device 114. The server system 120 include one or more server devices 122, 124, 126, etc. that can be linked to the communication network 130 through a switching or routing device 128. The components of the system 100 may be interconnected by any form or medium of digital data communication (e.g., the communication network 130). Examples of the communication network 130 include a local area network ("LAN"), a wide area network ("WAN"), and the Internet. Further, the components of the system 100 can implement wired or wireless mechanisms for connecting to the communication network 130, such as WiFi, WiMax, etc.

The server system 120 can implement a single server device to perform all server functions described in this specification. Examples of server functions include (1) managing secure connections with the client system 110, (2) file authentication; (3) managing operation of client system 110; and (4) managing data received from self-monitoring client system 110. In some implementations, separate server devices 122, 124 and 126 are implemented to manage different server functions.

Figure 2:
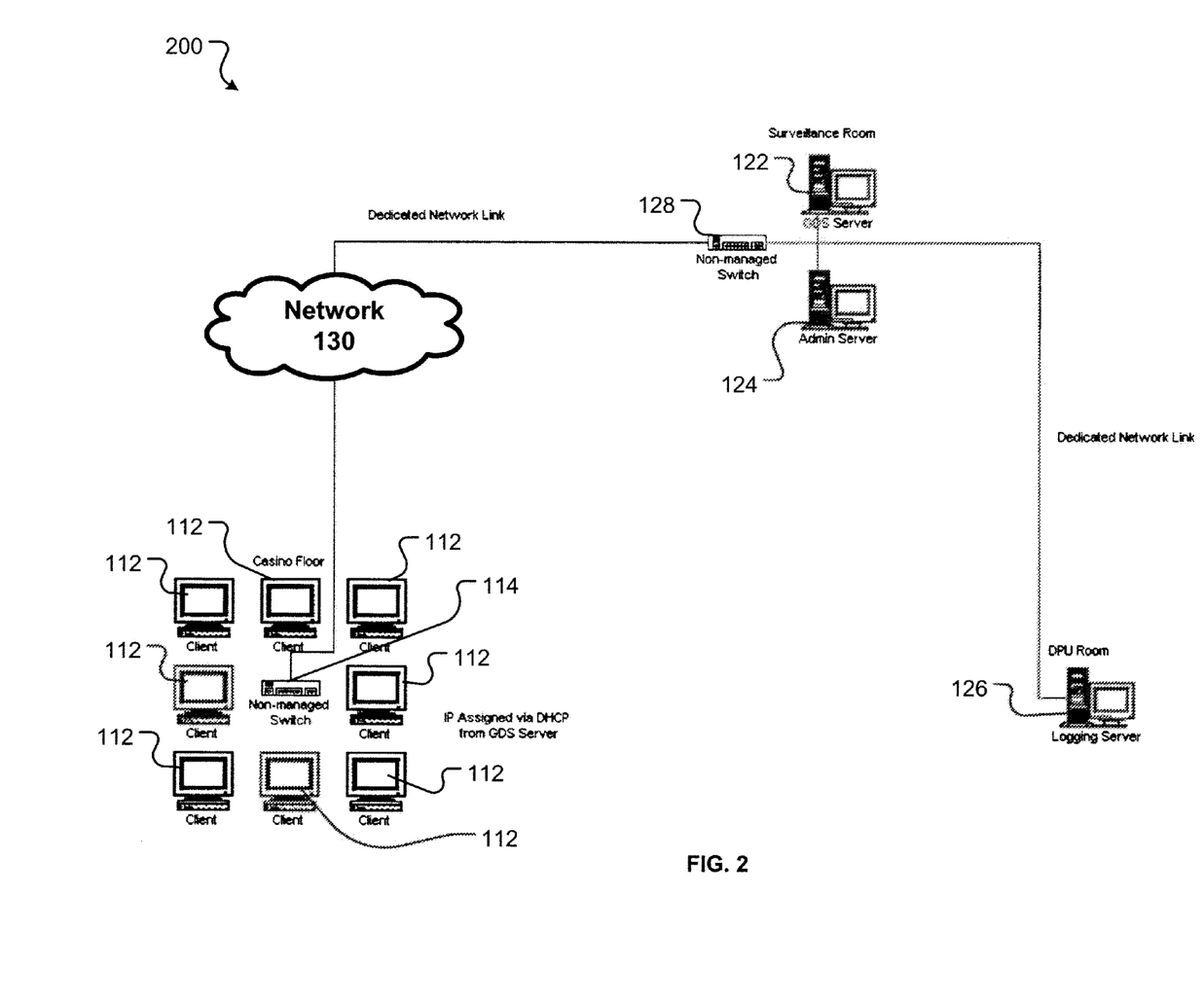
FIG. 2 is a block diagram of an example system for implementing separate server devices.

FIG. 2 is a block diagram of an example system 200 for implementing separate server devices. The system 200 provides a system based game play to the client devices 112 by implementing separate server devices 122, 124 and 126 to perform different server functions. For example, a Game Server 122, a Logging Server 126, and an Admin Server 124 can be implemented.

The client devices 112 can include slot gaming devices located on the casino floor. These client devices 112 can be networked to the Game Server 122 and the Admin Server 124 at a location remote from the client devices 112. For example, the Game Server 122 and the Admin Server 124 can be located in a surveillance room of the casino. Also, the Logging Server 126 can be located at a third location, such as a locked room or a locked cage.

The Game Server 122 performs server operations including determining the game outcome for all clients 112. The Game Server 122 stores for each client 112, a private environment for maintaining and cycling the random numbers that determine the game outcome. Random number generation is described further with respect to FIG. 6a-c below. Also, the Game Server 122 maintains a unique port for each client where events such as meters, tilts, wager information and game results are communicated. The Game Server 122 also performs software verification of all control programs on the Game Server.

The Logging Server 126 maintains separate logs of events that take place on the Game Server 122. For example, the Logging Server 126 maintains logs of events, such as server logins, game play information, commands executed on the Game Server 122, and software updates on the Gamer Server 122.

The Admin Server 124 provides a web based graphical interface for the various administrative functions of the Game Server 122. Using the Admin Server 124, an operator can allow client connections; enter client configuration data; verify control programs on the Game Server; view various logs and reports such as Game Server software authentication reports; view game recall for all clients 112; and view meter information for all clients 112.

Figure 3:
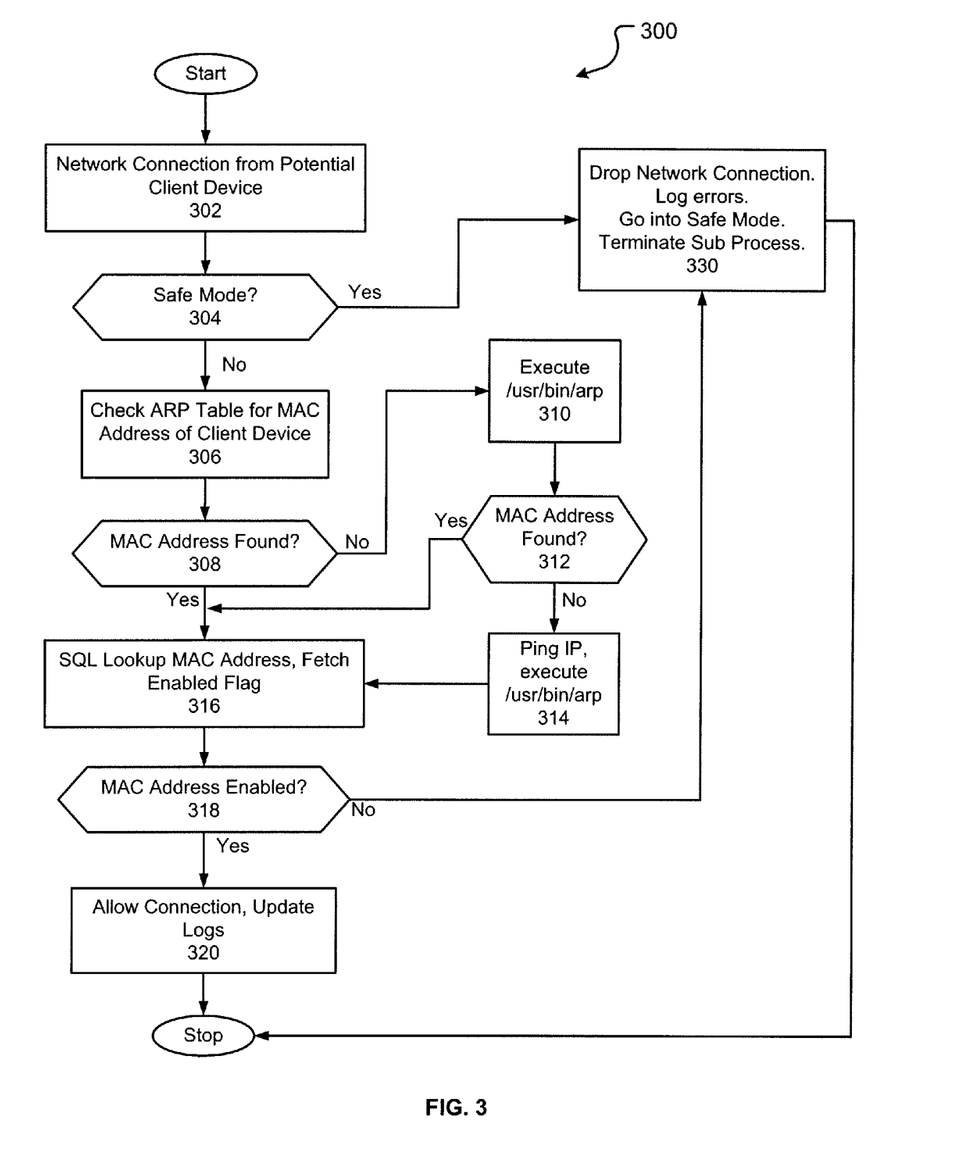
FIG. 3 is a process flow diagram showing an example process for managing secured connections with various client devices.

FIG. 3 is a process flow diagram showing an example process 300 for managing secured connections with various client devices. Each client device 112 completes a secured connection using a two-factor authentication process that includes primary authentication and secondary authentication. The two-factor process can be used to authenticate the client devices 112 without a client certificate. For each client device 112, client data is added to a server database associated with the Game Server 122 to maintain a list of valid client devices. The client data can be stored in the server database as an Address Resource Protocol (ARP) table, for example. Address Resolution Protocol maps Internet Protocol (IP) address to the Media Access Controller (MAC) address of each client device, which is kept in a memory table (e.g., an ARP table) by the operating system as part of a network stack. Media Access Controller is a chip on the client device that communicates on the network and has a unique address consisting of six 8 bit numbers.

Primary Authentication

The primary authentication is performed to determine whether the requesting clients are authorized clients. Only the authorized clients whose MAC addresses are found in a list of authorized clients authorized or allowed to connect to the server system 120. When the Game Server 122 receives a request for connection from a client device 112 (302), transmission control protocol (TCP) level headers are checked for identifying information of the client device, the information is compared to information sent in the authentication request packet from the client device, and verified against the server database.

The Game Server 122 determines whether the servers (e.g., the Logging Server 126, the Game Server 122 and Admin Server 124) are currently in a safe mode (304). The safe mode of operation can be triggered when an unauthorized client attempts to communicate with the Game Server 122. The safe mode is a mechanism to protect the Game Server 122 and other servers (e.g., Logging Server 126 and Admin Server 124) from unauthorized clients. When a client fails to authenticate, the servers switch to safe mode to stop. allowing any new connections until reviewed by a manager or administrator. All existing connections are not affected.

When the Game Server 122 determines that the servers are currently in the safe mode, the Game Server 122 drops network connections, logs errors and enters/maintains safe mode to terminate sub processes (330). When the Game Server 122 determines that the servers are not currently in the safe mode, the Game Server 122 checks the ARP table for the MAC address of the requesting client device (306). Based on the ARP table look-up, the Game Server 122 determines whether the MAC address of the requesting client device 112 is found (308).

When the MAC address is found (308), the Game Server 122 searches an SQL database for the client with the found MAC address, and when the client with the MAC address is found, the Game Server 122 fetches a flag that indicates whether the MAC address of the client device is enabled (316). The Game Server 122 determines whether the MAC address is enabled (318). If the fetched flag indicates that the client device is marked as enabled (i.e., not disabled), the primary authentication is successful. The connection is allowed and the logs are updated (320).

When determined that the MAC address is not enabled, the offending client device is disconnected, alarms are sent, and the server system 120 enters safe mode (330). The Game Server 122 drops network connections, logs errors and enters/maintains safe mode to terminate sub processes.

When the MAC address is not found at 308, the Game Server 122 executes /usr/bin/arp with IP address to read the ARP table (310). In TCP/Internet Protocol (IP) networks, the MAC address of a network interface can be queried with the IP address using the ARP for Internet Protocol Version 4 (IPv4) or the Neighbor Discovery Protocol (NDP) for IPv6, for example. The Game Server 122 determines whether the MAC address is still not found (312). When the MAC address is found, the Game Server 122 performs (316), (318) and (320) as described above.

When the MAC address is still not found at 312, the Game Server 122 executes internal PING with an IP address to populate the ARP table, and execute /usr/bin/arp with the IP address to read the ARP table (314). Then the Game Server 122 performs (316), (318) and (320) as described above to complete a successful primary authentication or end an unsuccessful primary authentication.

Those client devices whose MAC addresses cannot be found or are disabled are disconnected and the server system 120 enters the safe mode.

Secondary Authentication

Figure 4:
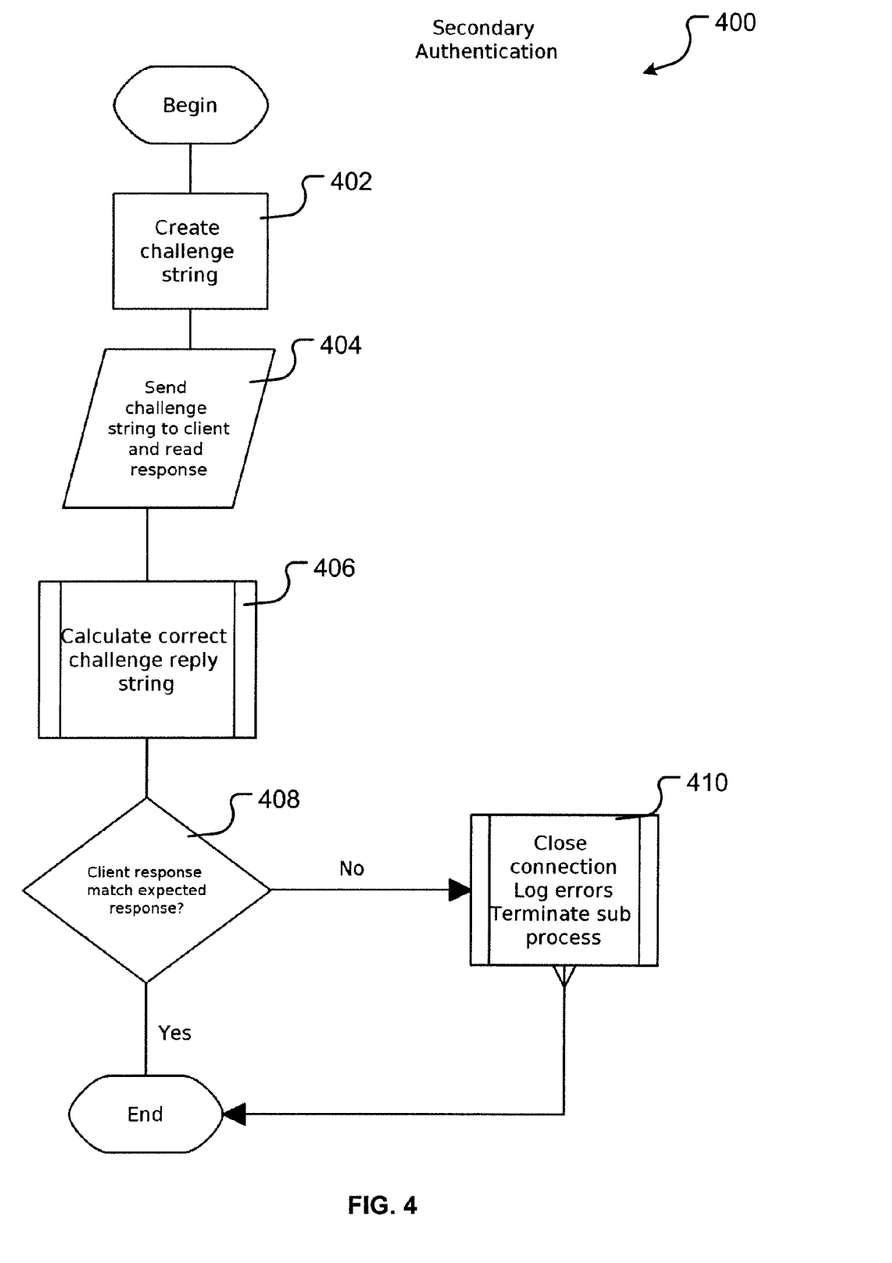
FIG. 4 is a process flow diagram showing an example process for performing the secondary authentication portion.

FIG. 4 is a process flow diagram showing an example process 400 for performing the secondary authentication portion. As a brief example, three words are randomly chosen from a large pool of words, and one or more arbitrary numeric value is generated by the Game Server 122. These words and number(s) are manipulated to produce a value. The words and number value(s) are sent to the connecting client, and the client performs the manipulation and sends the reply to the server. The server compares the client's manipulated value to its own value, and if the two values agree, authentication is granted.

The Game Server 122 creates a challenge string (402). To create the challenge string, the Game Server 122 selects for example three words out of a pool of predetermined and stored challenge/reply words. An example pool of challenge/reply words may include the following words: privacy, aloofness, clandestineness, cloister, confidentiality, covertness, hermitage, incognito, isolation, mew, reclusion, sanctum, seclusion, secrecy, integrity, coherence, estimableness, homogeneity, honor, incorruptibility, inviolability, irreducibility, rectitude, reputability, unimpeachability, authentication, accredit, avouch, buttress, circumstantiate, corroborate, substantiate, validate, and warrant.

The Game Server 122 also determines an epoch time as a time stamp. For example, the epoch time can include time represented in seconds since Jan. 1, 1970. The Game Server 122 assembles the challenge string by combining the selected three words and time stamp in the form of 'word1 word2 epoch-time word3'. For example, a challenge string can be created using the words, 'privacy', 'coherence', 'buttress' and epoch-time '1102343849' as 'privacy coherence 1102343849 buttress'.

Then the Game Server 122 reverses and concatenates the created challenge string. For example, the above example challenge string after reversal and concatenation is '1102343849 buttressssserttub 9483432011 ecnerehoc ycavirp'.

The Game Server 122 sends the created challenge string to the client device and reads a response sent back from the client device (404). For example, the example challenge string 'privacy coherence 1102343849 buttress' can be sent to the client device. In response to the challenge string, the client device can send a challenge reply back to the Game Server 122. For example, the received challenge reply may be 'a371e4e150'.

The Game Server 122 calculates the correct challenge reply string using the created challenge string and the reversed and concatenated string (406). The Game Server 122 applies a hash function to the created challenge string and the reversed and concatenated string. For example, the Game Server 122 uses Secure Hash Algorithm-1 (SHA-1) to hash the reversed and concatenated string to generate a 40 character hash string. SHA-1 is Federal Information Processing Standards (FIPS) 180-2 compliant hash algorithm.

Using an offset table, the Game Server 122 selects 10 characters of this string based on the last digit of the client's IP address. An example offset table is show below as Table 1.

TABLE 1

Offset Table

| Last Digit | Start Index |
|---|---|
| 0 | 4 |
| 1 | 10 |
| 2 | 11 |
| 3 | 2 |
| 4 | 22 |
| 5 | 17 |
| 6 | 8 |
| 7 | 25 |
| 8 | 1 |
| 9 | 7 |

The Game Server 122 determines whether the challenge reply received from the client matches the expected challenge reply generated by the Game Server 122 (408). The Game Server 122 compares the client's challenge reply with the 10 character string generated by the Game Server 122. If the two strings match, the secondary authentication is deemed successful and the connection is allowed.

If the two strings do not match, the secondary authentication is deemed a failure and the offending client is disconnected. The server system 120 enters the safe mode, raises alarms and terminates the current sub-process as described above (410).

File Authentication Using Changing Keys

In another aspect, the Gamer Server 122 performs file authentication using changing keys to verify integrity of a master file containing all valid hash values for all files contained in the Game Server 122. The master files includes a complete list of all files in the server, the path of each file, timestamp for each file, and file attributes. The file attributes can include UNIX file attributes, such as 'read only', 'hidden', etc. The master file is generated during the creation of the installation medium, and the master file is only alterable by an official patch installation program. The master file is encrypted with a one time use 256 bit twofish key. Each time the file is decrypted, a new key is generated and the master file is encrypted with this new key. This 256 bit twofish key is then encrypted with a 15360 bit public key and stored in the server database.

Figure 5:
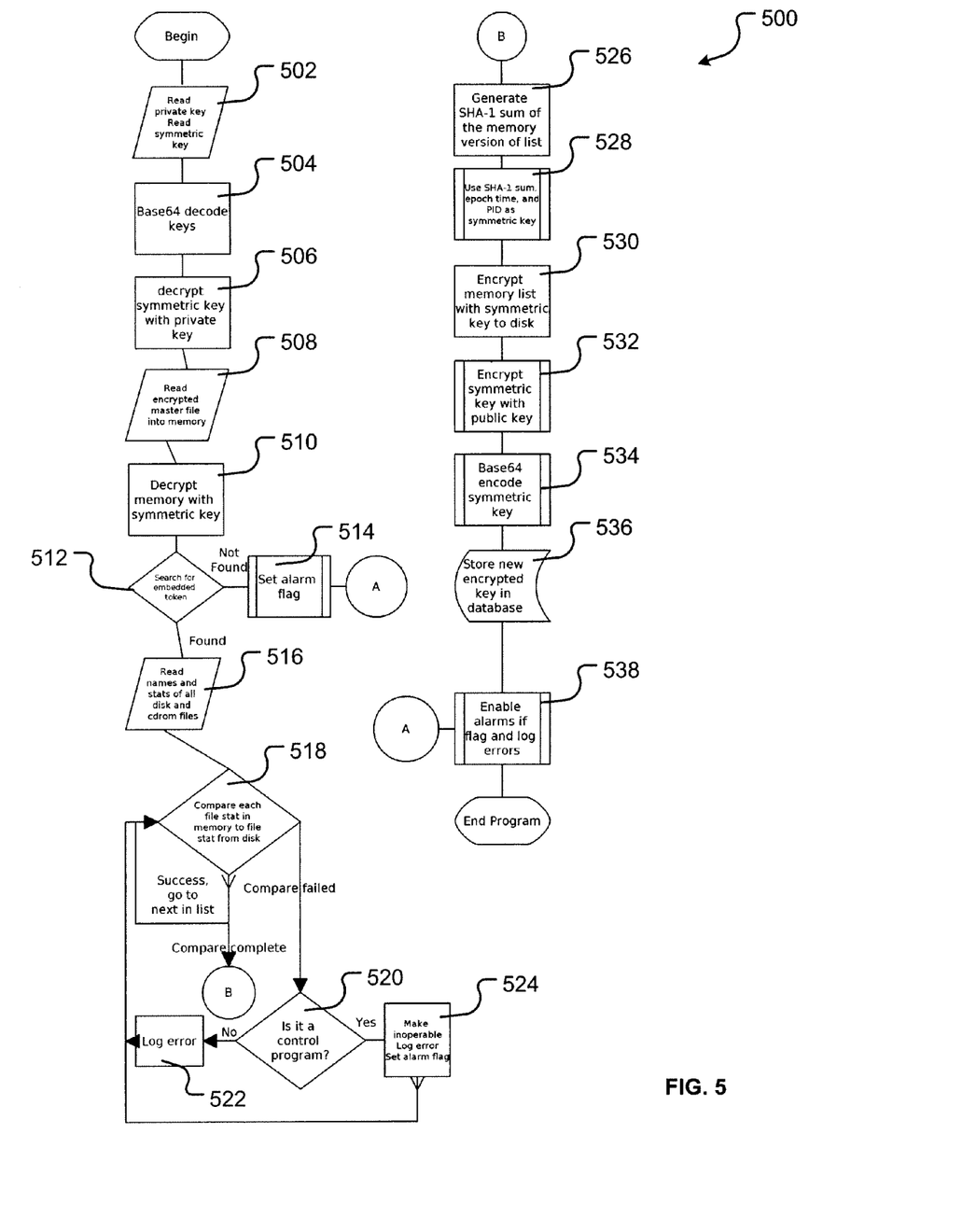
FIG. 5 is a process flow diagram showing an example process for performing file authentication.

FIG. 5 is a process flow diagram showing an example process 500 for performing file authentication. File authentication can be performed periodically (e.g., every 24 hours) or on demand. By authenticating the master file, every file in the Game Server 122 can be authenticated. The master file is encrypted using two keys.

First, a symmetric Twofish key of 256 bits is applied on the master file. Then, public key infrastructure (PKI) encryption is applied on the Twofish key. In cryptography, PKI is used to bind public keys with respective user identities by means of a certificate authority (CA). The user identity must be unique for each CA. The binding is established through the registration and issuance process, which, depending on the level of assurance the binding has, may be carried out by software at a CA, or under human supervision. The PKI role that assures this binding is called the Registration Authority (RA). For each user, the user identity, the public key, their binding, validity conditions and other attributes are made unforgeable in public key certificates issued by the CA. The encrypted master file and the PKI encrypted Symmetric Twofish key are base-64 encoded.

A Twofish key is a max 32 byte (256 bit) key and was one of the 5 contenders for the Advanced Encryption Standard (AES) that were cryptographically secure but not chosen. Twofish is slower than Rijndael when using 128 bit keys, but faster when using 256 bit keys as implemented in this specification.

In some implementations, other hash algorithms, such as the AES are used. AES (aka Rijndael) has a max 32 byte (256 bit) key and is FIPS 197 compliant. As an example, the 192 bit keys used with AES or higher are required for all US TOP SECRET documents. For normal encryption such as online banking, 128 bit keys are used. Thus, the 256 bit keys, which are the default keys with the twofish library, exceed the AES requirement for US TOP SECRET documents.

Symmetric key ciphers, such as AES or Twofish use smaller keys than asymmetric key ciphers, such as PKI, which should use 15360 bit keys per National Institute of Standard and Technology (NIST) to be safe until the year 2030. Comparable key sizes can be found in NIST publication SP800-57Part1_6-30-06.pdf at pages 62-63.

Because the secondary authentication encrypts more than a few bytes, a chaining mechanism, such as Cipher Block Chaining (CBC) is used.

To authenticate the master file and all files in the Game Server 122, decryption and decoding are performed. The Game Server 122 reads the private PKI key and the encrypted symmetric twofish key from a database (502). The Game Server 122 Base64 decodes the read PKI private key (504). The Game Server 122 decrypts the symmetric twofish key using the decoded private PKI key (506). The Game Server 122 opens the encrypted master file (e.g., md5.master) and reads the contents into memory (508). The Game Server 122 decrypts the 'in memory' version of the encrypted master file with newly decrypted symmetric key (510).

The Game Server 122 searches the decrypted "in memory" version of encrypted master for an embedded token, such as a 'gds_server' entry (512). If the token is found, the decryption is deemed valid and the process 500 continues at (516). Otherwise, the decryption is deemed invalid and the Game Server 122 sets off alarms (e.g., every 2 minutes) until cleared by a human intervention (514).

When the embedded token is found at (512), the Game Server 122 reads the names and stats of all disk and CDROM files (516). The Game Server 122 compares each read file status in the 'in memory' version of the master file to the file status from the disk and CDROM (518). When the Game Server 122 determines that the comparison is a success, the process continues to 'B' to encrypt the authenticated master file. The comparison is considered a success when no changes are detected from the 'in memory' version of the master file.

When the Game Server 122 determines that the comparison is a failure, the Game Server 122 determines whether the failed file is a control program (520). A control program is a program relevant to game outcome, and thus any change to the control program cannot be tolerated. Changes to programs that are not related to game outcome may be tolerated. Starting at the root directory, a list of all files and their file attributes are obtained from a disk. For each file in a newly generated list, the file status is read from disk to those in memory.

When changes are detected for a control program, the Game Server 122 generates a warning signal, makes the program(s) inoperable, and logs an error. (524). When changes are detected in a non-control program, the Game Server 122 generates an error log based on the comparison (522). However, no alarms are generated when changes are detected in a non-control program.

The control programs are critical files that may stop game play for the client devices when a change (e.g., modification or deletion) is detected. These files are related to the game outcome. A non-exhaustive list of example control programs are show in Table 2 below.

TABLE 2

Examples of Files

| | | |
|---|---|---|
| Control Files | /opt/gds* | This is the parent directory of all gaming programs. |
| | /var/www* | This is the parent directory of all web based applications related to users. |
| | /bin* | |
| | /usr/bin* | |
| | /sbin* | |
| | /usr/sbin* | |
| | /usr/local/bin* | |
| | /usr/local/sbin* | |
| | /lib | System library files (not expected to change) |
| Non-Control Program | /proc | Running process list (expected to change) |
| | /var | Database files in /var/lib/pgsql (expected to change) |
| | /tmp | Temporary files (expected to change) |
| | /sys | Pointers to hardware, memory contents (expected to change) |

The comparison 518 continues for each file in the list until all files have been compared and authenticated. Once all files have been compared and authenticated with either no changes or changes only to non-control programs, the process 300 continues to 'B' where the authenticated master file is encrypted. The Game Server 122 generates SHA-1 sum of the 'in memory version' of the decrypted master file (526). The Game Server 122 uses the generated SHA-1 sum, current time (as number of seconds since Jan. 1, 1970), and current process id, as a new symmetric key (528). The Game Server 122 uses the generated symmetric key (e.g., a twofish key) to encrypt the 'in memory' version of the master file (530).

The Game Server 122 saves the encrypted 'in memory' version of the master file to disk to overwrite the previous version of the master file. The Game Server 122 encrypts the newly generated symmetric key with the PKI public key (532). The Game Server 122 Base64 encodes the PKI encrypted symmetric key (534). The Gamer Serer 122 saves the Base64 encoded encrypted symmetric key in a database for storage (536). When an alarm flag (e.g., from 514) is detected, the Game Server 122 enables one or more alarms to alert a human operator.

Random Number Generation (RNG)

An RNG module or process, such as a keep-it-simple-stupid (KISS) RNG module is embedded directly into a Game Server application instead of a traditional stand alone executable in each client device. The KISS RNG module is a pseudo-random number generator that can manufacture numbers based on 4 complex formulas, each of which produces a value referred to as a 'seed' value. Thus, four seed values and 4 unique formulas, 1 formula per seed, are provided for each client device. Each formula takes the current numeric value of an associated seed, applies the specified formula to the existing seed value to generate a new value. The generated new value is stored as the current seed value. In such manner, the 4 seed values are repeatedly incremented. The RNG module assigns to each client device (e.g. client device 112) a memory environment containing the 4 seed values used by the RNG module and the 5 random numbers generated by the RNG module at each cycle. Each random number is the result of applying math algorithms to all 4 seeds. The process is repeated for each random number.

The RNG module tracks the number of attached (as opposed to configured) client devices and cycles through the unique environments associated with the attached devices in a round robin fashion. An attached client is one that has established a network (and authorized) connection. A configured client is one that is listed in the database (As the RNG module cycles through each unique environment, 5 calls to a function, e.g. KISSrand function, generate 5 random numbers. The current seed values and the generated random numbers are stored in the Game Server 122 memory for use in the next cycle.

When Game Server software or application for a particular client device requests random numbers, the current random numbers are read or accessed from the client device's unique environment and presented to the Game Server software for that particular Client. These random numbers are only used for game outcome determination, for that particular Client. Before reading the random numbers, the RNG module checks a counter value to insure that number generation has incremented at least twice, which helps avoid exposure of the RNG internal process by not sending every random number generated.

The RNG module includes a self governing process that regulates and varies a speed of random number generation on an ongoing basis. This self governing process can be a hard coded feature of a program code and cannot be changed or altered during game play or by virtue of editing the code or configuration files once the Game Server software is installed. The self governing process can be set during compilation of the program code, and thus any modification/tempering can be detected as an unacceptable change to the Game Server software from the standpoint of the file authentication process described with respect to FIG. 5 above.

The self governing process is associated with a performance target in terms of cycles per second for each client. This performance target can be based on capabilities of each client device. For example, the performance target can be set at 120 cycles per second per client. When an average performance value drops below the set target, the cycling is increased. When the average performance value is increased beyond the performance target, the cycling is decreased by introducing one or more delays.

Once the generated 5 random numbers are supplied to the Game Server software, the generated 5 random numbers are passed to another module, such as a Wincheck module that determines a game outcome for each client device. The Wincheck module includes a representation of a resulting screen matrix that can be built in memory. This screen matrix is cross-referenced by the client device to determine winning pay-lines and losing pay lines for a slot-machine game. For example, the pay-lines and pay-line configuration can access the screen matrix in order to determine winning and losing pay-lines. Typically the screen matrix consists of any visible reel positions in a Slot game, or cards in a Card game.

Also, when a bonus round is detected during game play, the process of obtaining random numbers is repeated for each Free Play game. Each game, whether Free Play or regular play, is based on its own unique call to the RNG module. Game results are not determined only when requested by the client device, and thus the game results need not be determined in advance.

Additional functions, such as a Bonus Round Multiplier function can rely on the RNG module. In the Bonus Round Multiplier function, a game participant at a client device is presented with 5 display items at the end of the Bonus Round, with each one representing an unknown number. The game participant selects one of the display items that determine the multiplier value for the Bonus Round. The total amount won during the Bonus Round is then multiplied by this selected Bonus Multiplier.

The bonus multiplier values can include 2, 3, 4, 5 and 6, for example. Each of the 5 random numbers generated is paired with one of the bonus multiplier values in the order the random number was generated, and the random number is used as a positional value in a data array. As an example, the random numbers could be 7, 3, 31, 7 and 22. For such example random numbers, the pairings can be as shown below.

```
2,  3,  4,   5,  6

|   |   |    |   |

7,  3,  31,  7,  22
```

Then, an empty array is created.
( )
Each bonus multiplier is inserted into an array position of its corresponding random number. The first bonus multiplier, 2, is inserted into the $7^{th}$ array location
(0,0,0,0,0,0,2)
This is repeated for each value—
(0,0,3,0,0,0,2,0,0,0,0,0,0,0,0,0,0,0,0,0,0,0,0,0,0,0,0,0,0,0,0,0,4)
However, for the $4^{th}$ bonus multiplier, the array location may be already taken. The bonus multiplier value is inserted in the next available position, which is the $8^{th}$ position, and add the last value into position 22—

(0,0,3,0,0,0,2,5,0,0,0,0,0,0,0,0,0,0,0,0,6,0,0,0,0,0,0,0,4)

Throw away the null positions—

(3,2,5,6,4)

The bonus multipliers are presented on the screen in the above described order.

Seeding of RNG

Figure 6A:
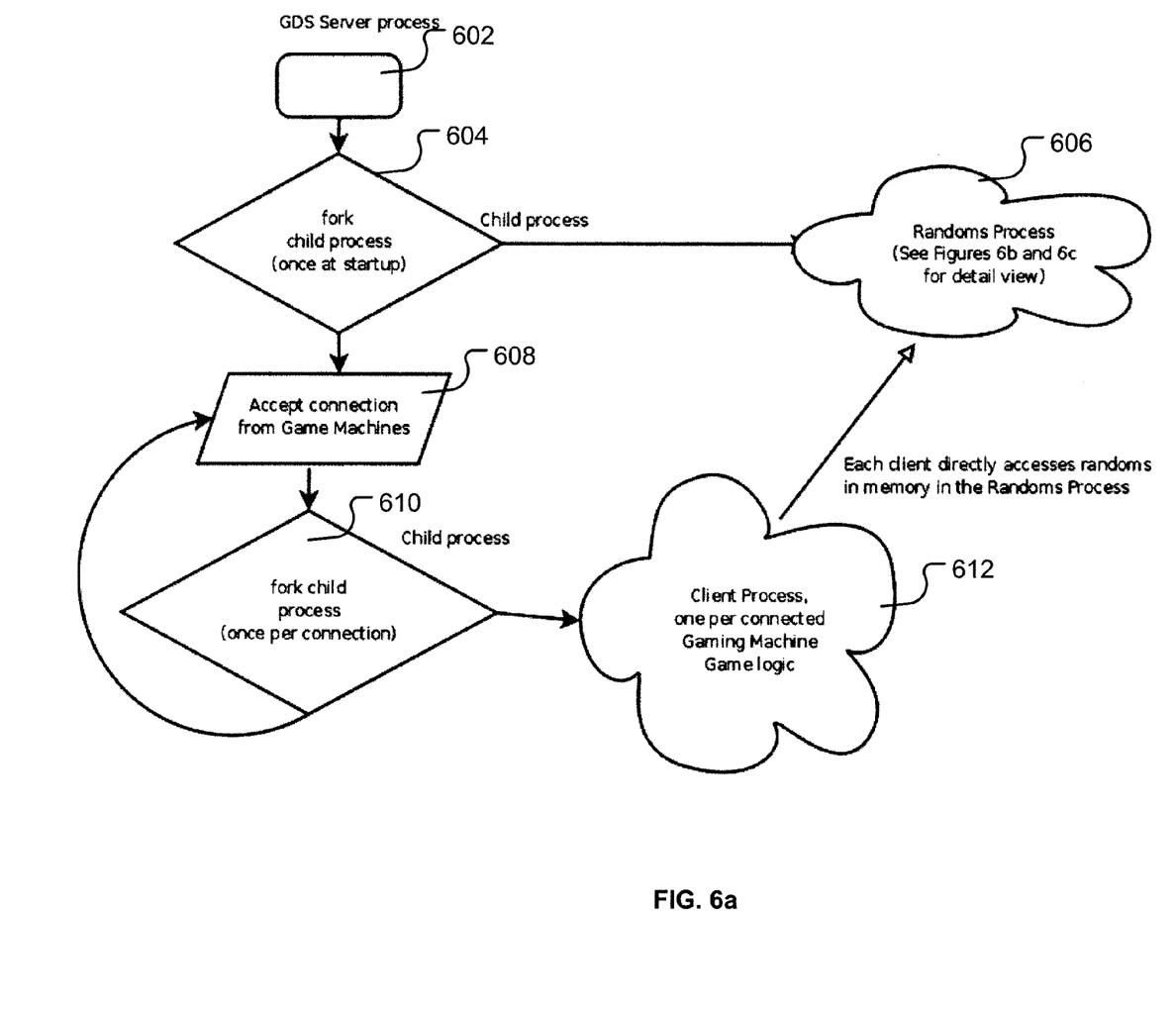
FIGS. 6a, 6b and 6c show an example RNG process for seeding of RNG for each client device.
Figure 6B:
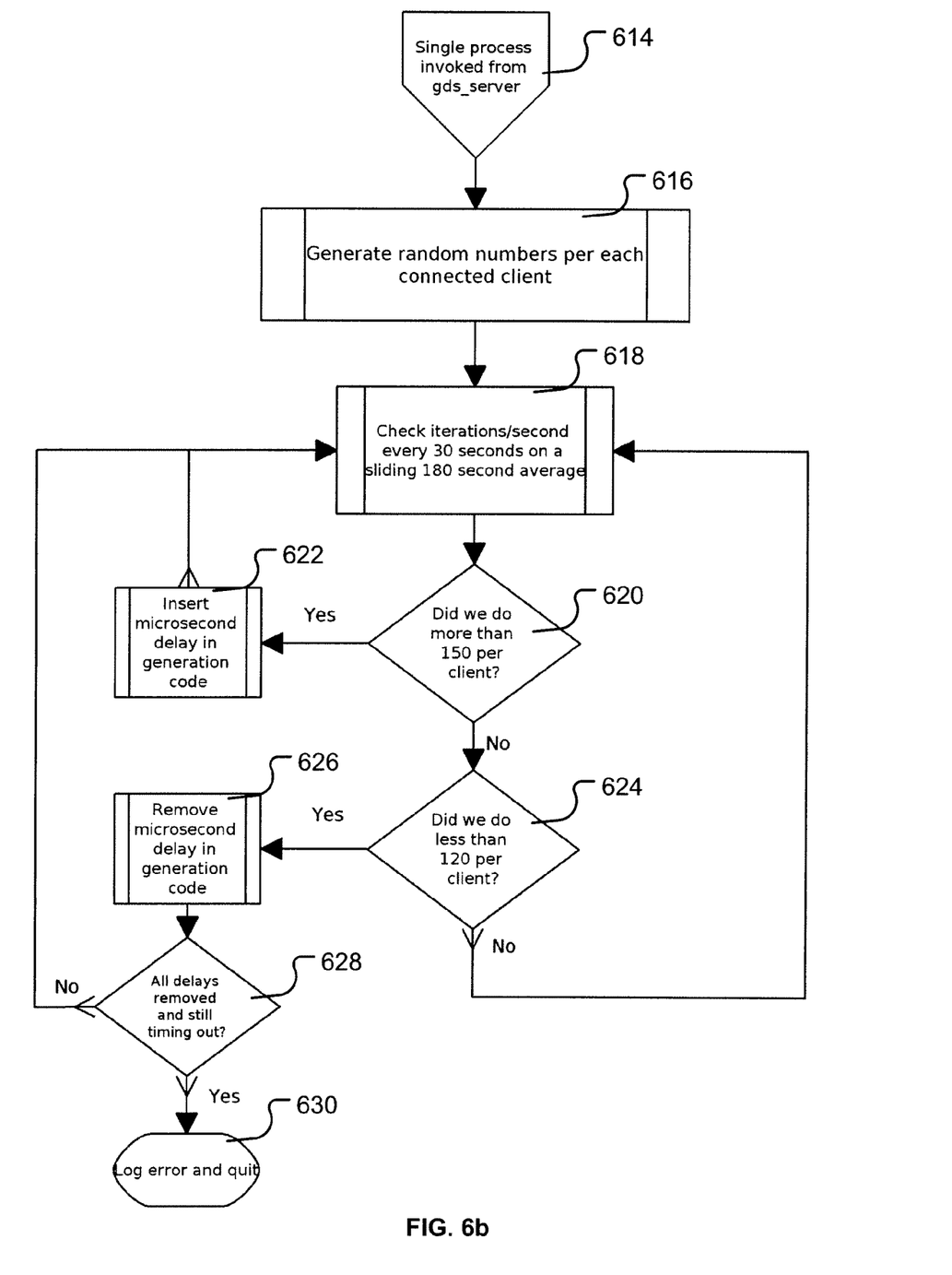
Figure 6C:
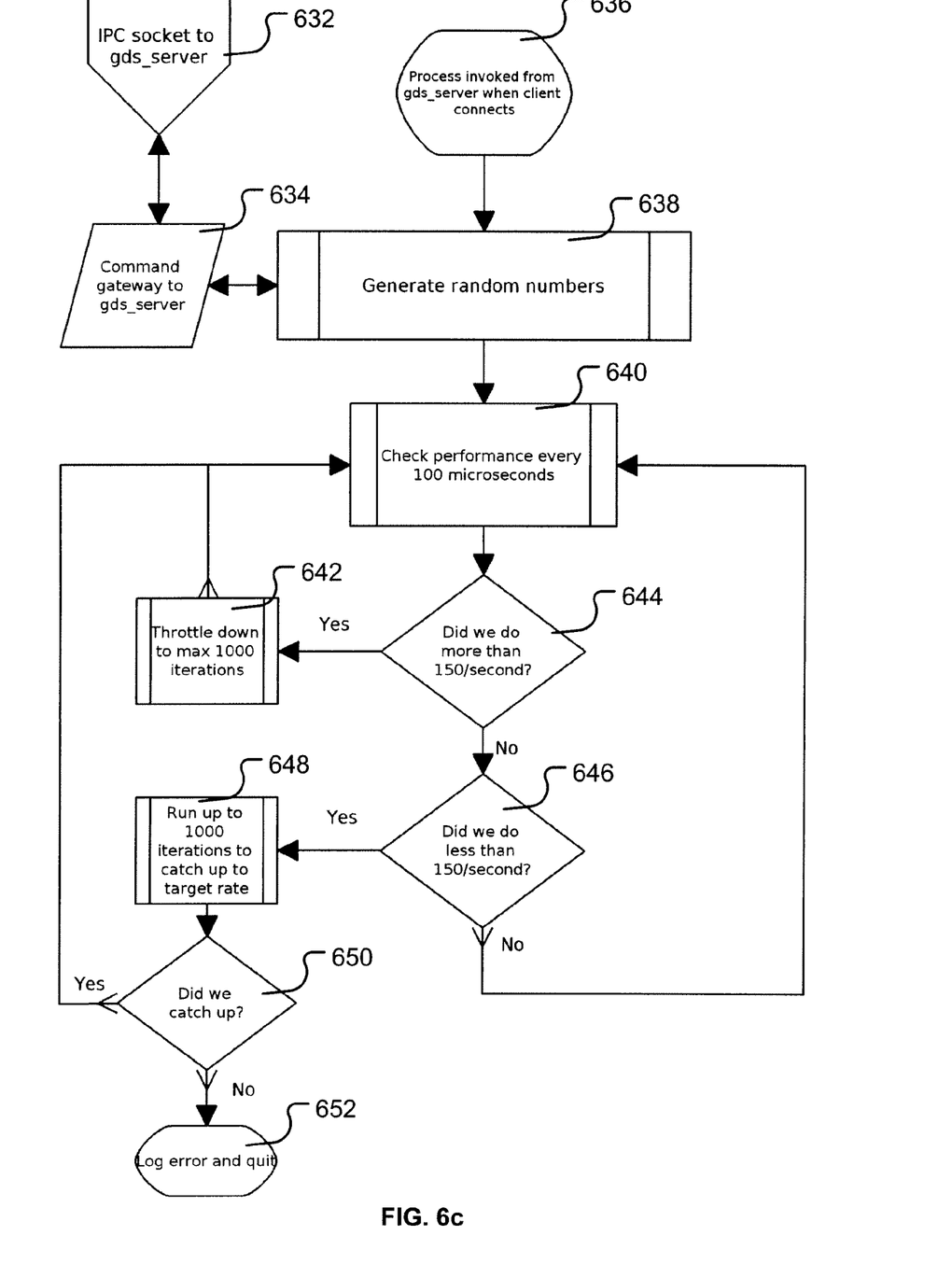

FIGS. 6a, 6b and 6c show an example RNG process 600 for seeding of RNG for each client device. The RNG process 600 can be implemented to allow the current seeds (e.g., w, x, y, and z) to be pushed and popped with up to 64 unique environments associated with 64 client devices to hold the seed information. The random sequence generator is attached to an active client device; seed values are restored; one or more iterations of the sequence are run; and seed values are read and saved. This process is repeated for each active slot or client device.

Once the Game Server process is invoked and running, the RNG process 600 begins (602). At startup, the Game Server determines whether to generate a child process (604). The child process includes the Game Server process copying itself into the Game Server's memory (fork) with instructions for demanding and obtaining random numbers from the RNG process 600. When a child process is generated, at least two random server processes can be performed (606).

FIG. 6b shows an example random server process invoked at 606. The Gamer Server invokes a single process for generating and updating random numbers (614). The RNG process 600 cycles through the various client environments and bumps the seed values to create a stream of Random Numbers for each connected client device (616).

As each client environment is created, the RNG process 600 seeds the respective RNG environment. The initial 4 seed values are set. Two of the seeds (e.g., seed.w and seed.z) are hardcoded into the program itself per the kissrand code instructions, for example. The remaining seeds (e.g., seed.x and seed.y) are random in nature. The two initial values for these two variable seeds can be generated as a result of making two calls to the Perl function rand( ), which uses /dev/urandom and/or /dev/random to seed itself. The returned values are passed to the Init function of the kissrand function at which time they are immediately changed by the kissrand function itself. An example code is shown as follows:

```
void initRand( unsigned int v1, unsigned int v2 )
/* Initializes seed set. This routine must be called at process start-up
* only. Passed values v1 and v2 should be non-constant and unpredictable.
*/
{
  seed.w = 916191069L; // DO NOT CHANGE THIS VALUE !!!
  seed.x ^= v1;        // Xor with unpredictable number
  seed.y = v2 | 1;     // OR w/1 to insure non-zero value
  seed.z = 521288629L; // DO NOT CHANGE THIS VALUE !!!
```

If, during the Secondary Authentication, the Games Server recognizes the authenticated client device from a previous session, then that recognized client device is not deemed as a new slot machine but a returning slot machine, and thus the last known seeds are restored from the database replacing the above referenced seed values. At that point the RNG process 600 continues as if never interrupted. It is only when the GDS Server does not recognize the calling client that the seeds referenced above are employed. Therefore each client device has its own unique RNG seeds and its own unique RNG output.

As described above, the RNG process 600 is self monitoring. The Game Server periodically checks a rate of iteration per second of the RNG process (618). For example, a running average (say 30 seconds average) is kept and used as a benchmark. The RNG process 600 is allowed to run as fast as possible when first started. Then, using the 30 second average, the rate of iteration is checked for an upper target in an operating range (620). This allows the RNG process from running too fast or too slow based on the capabilities of the client devices and/or the Game Server. As needed, a series of delays are introduced into an iteration loop until the loop reduces to target iterations per second, such as 120 iterations per second. For example, a determination is made whether the rate of iteration is more than a set rate (say 150/second) for each client. When determined that the rate is more than the upper target, a delay is inserted into the iteration loop (622). The period of delay is in the range of microseconds. After this delay is inserted, the rate is checked again (618).

When the detected rate of iteration is less than the upper target, such as 150 iterations/second, the iteration rate is checked against a lower target (624). When the iteration rate is detected to be lower than the lower target, one or more of the added delays (e.g., in microseconds) are removed to speed up the rate of iteration (626). After all of the delays have been removed, a determination is made on whether the iteration is still too slow and causes time-out events (628). When determined that the process is still timing out, the Gamer Server logs the error and quits/ends the process (630). However, if all of the delays have been removed and the process does not time out, the rate of iteration is checked again on the next cycle (618). When the detected rate of iteration at 624 is not lower than the lower target (e.g., 120 iterations/second), the iteration rate is checked again in the next cycle (618). Thus, a self monitoring system is provided to control the speed per second of a seeded RNG value generated within a specified range of random numbers.

FIG. 6c shows another example random server process. As described with respect to FIG. 6a above, a Game Server process is invoked (602). At startup, the RNG process generates a child process (604). When one or more client devices connect to the Game Server, the Game Server invokes a single process (636). Also, IPC (Inter Process Communication) socket to the Game Server can be used to provide command gateway to the Game Server, which would allow control signals to be sent to the Game Server (632). Then the RNG process 600 cycles through the various client environments and bumps the seed values to create a stream of Random Numbers for each connected client device (638).

The performance of the RNG process (e.g., rate of iteration) is periodically checked (640). For example, the performance can be checked every 100 microseconds. The RNG process 600 is allowed to run as fast as possible when first started. Then, periodically (every say 100 microseconds, for example), the rate of iteration is checked against a set target instead of a range (644). This allows the RNG process from running too fast or too slow based on the capabilities of the client devices and/or the Game Server. As needed, a series of delays are introduced into an iteration loop until the loop reduces to target iterations per second, such as 150 iterations per second. For example, a determination is made whether the rate of iteration is more than 150/second for each client. When determined that the rate is more than the upper target, the performance is throttled down to a maximum iterations, such as 1000 iterations (642). After throttling down the performance, the performance is checked again in the text 100 microsecond cycle (640).

When the detected performance is determined to be not more than the target, such as 150 iterations/second, the performance is checked to determine whether the performance falls below the target (646). When the performance is detected to be lower than the target, the number of iterations is increased to catch up to the target rate (648). For example, up to 1000 iterations can be performed. After running up the number of iterations, a determination is made on whether the iteration is still too slow and causes time-out events (650). When determined that the performance is still too low, the Gamer Server logs the error and quits/ends the process (652). However, if the performance has caught up to the target rate, the performance is checked again on the next 100 microsecond cycle (640). When the detected performance at 646 is not lower than the target (e.g., 150 iterations/second), the performance is checked again in the next 100 microsecond cycle (640). Thus, a self monitoring system is provided to control the speed per second of a seeded RNG value generated within a specified target of random numbers.

Thus, the RNG process 600 monitors and adjusts its own internal speed in real-time, and while running at a minimum speed supplies random numbers to a Game Server on demand. The demand for random numbers starts with a participant playing a game at a client device, such as an Electronic Game Machine (EGM). The EGM then sends a game message to the Game Server. The Game Server receives the game message and having previously determined which specific game is currently being played starts a random-number-demand-process.

The RNG process can be performed through a master RNG process with known memory locations for each Gamer Server environment to obtain its own unique random numbers. Alternatively, the RNG process can copy itself to each client devices connected to the Game Server. Each game environment can demand its own random numbers from each assigned RNG.

Multiple Games Per Client Device

Unlike the stand-alone slot machines, the client devices (e.g., client devices 112) described in this specification do not include a game or set of games fixed onto the device. The games and associated game rules are located within the Game Server and available to the client devices over a network. A participant at a client device can be provided with a choice of games from a pool of available games at the Gamer Server. Thus, the participant can play all available games in a casino without having to move to a different client device. This can include the client device executing a game that resides on the GDS Server.

Real-time Log of Game Data to Remote Machine

At each game outcome, a record (e.g., a comma separated value (CSV) record) is generated containing information indicative of each game outcome. For example, the generated record can include date, time, client id, game id, wager amount, lines wagered, wager per line, bonus indicator, total bonus amount, bonus_multiplier, and base game win amount associated with each game outcome. This record can be written to at least one of a Game Server (e.g., Game Server 122) and a remote Logging Server (e.g., Logging Server 126), where it can be polled by an administrative terminal or reporting system to display real time statistics. A game outcome includes each spin of a slot machine that indicates whether the participant won or lost. The record can be used for administrative and reporting purposes. For example, the information from the generated record can be used to determine how long each participant stayed and play at each client device, how much he wagered, and how much he won or lost in real time. In contrast, a conventional system provides only the information polled from each client device for accounting purposes. For example the conventional polled information provides a total dollar amount collected at each machine at the end of each day.

Figure 7:
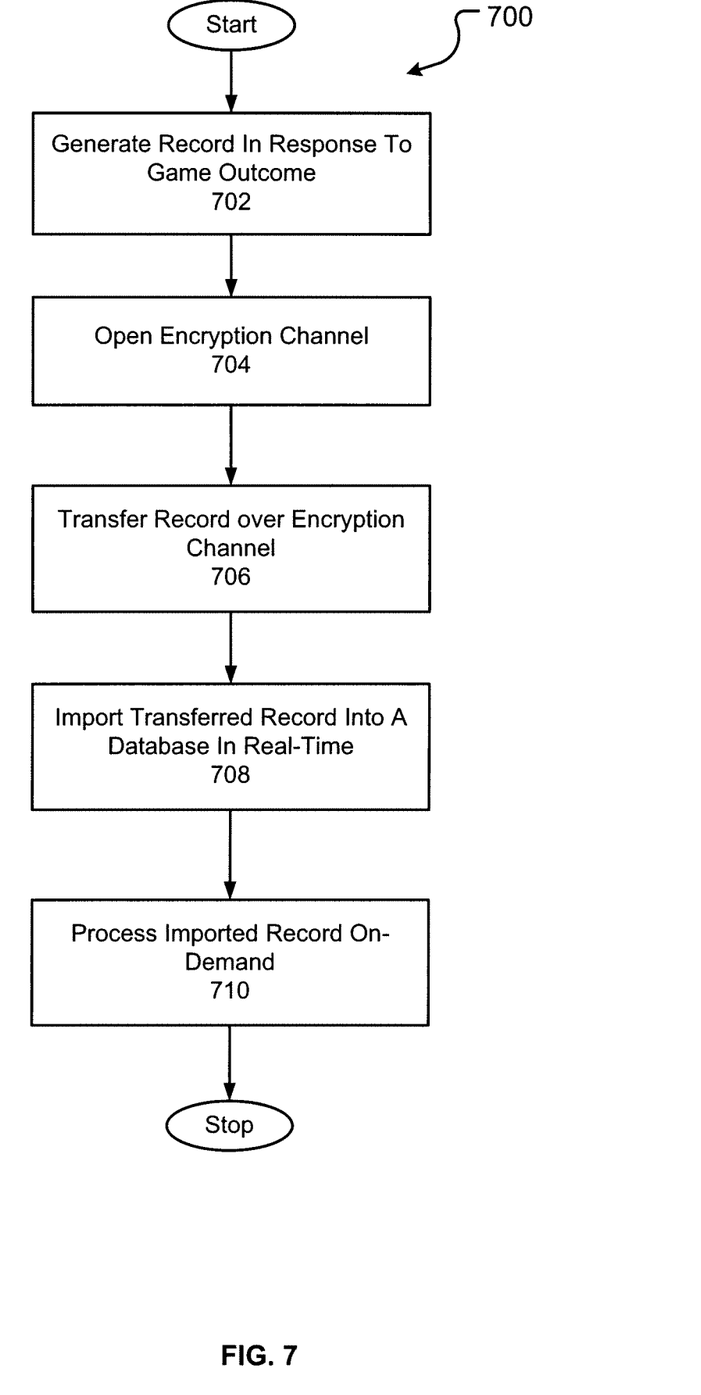
FIG. 7 shows an example method for storing Game Server data to another Server on real time basis.

FIG. 7 shows an example method for storing Game Server data to another Server on real time basis for administrative and reporting purposes. The record associated with a game outcome can be generated to include one or more of the above described information in a CSV record format, for example (702). The record is generated every time a game ends (e.g., every time a reel spins on the slot machine), and one line is logged in real-time. An encrypted channel is opened from the Game Server 122 to a remote client (704). The generated record is transferred over the opened encrypted channel to the remote machine (706). The transferred record is imported into a database in real-time (708). The imported record can be processed on-demand to obtain real-time information regarding each client device.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few variations have been described in detail above, other modifications are possible. For example, the logic flow depicted in the accompanying figures and described herein does not require the particular order shown, or sequential order, to achieve desirable results.

What is claimed is:

1. A server-based gaming system, comprising:
   one or more gaming machines; and
   a server in communication with the one or more gaming machines, comprising:
       a random number generator configured to assign a unique memory environment to each of the one or more gaming machines, and configured to generate at least one respective random number for each of the unique memory environments; and
       a memory device configured to store the unique memory environments, and to store one or more game applications selectably accessible by the one or more gaming machines,
       wherein, the random number generator is configured to periodically update the respective at least one generated random number in each of the unique memory environments at an update rate; and
       wherein the random number generator is configured to regulate the update rate by:
           setting an upper update rate and a lower update rate for updating the random numbers based at least on data processing capability of the gaming machines; and
           modifying the update rate to stay within a range defined by the upper update rate and the lower update rate.

2. The server-based gaming system of claim 1, wherein each of the unique memory environments comprises seed values used by the random number generator to generate random numbers for each gaming machine.

3. The server-based gaming system of claim 1, wherein the random number generator is further configured to regulate the update rate by:
   setting a target rate based at least on data processing capabilities of the gaming machines; and
   modifying the update rate to stay at or near the target rate.

4. The server-based gaming system of claim 1, wherein the server is further configured to provide at least one of the plurality of game applications to the one or more gaming machines in response to a request for one or more of the game applications.

5. The server-based gaming system of claim 1, further comprising:
   a module associated with one of the unique memory environments for determining a game result of one of the game applications selected by one of the gaming machines.

6. The server-based gaming system of claim 1, wherein the server is further configured to:
   provide a game application to one of the gaming machines in response to a request for the game application from the requesting gaming machine.

7. The server-based gaming system of claim 6, wherein the server is further configured to:
   determine a game result associated with one of the game applications selected by one of the gaming machines using one of the unique random numbers in one of the unique memory environments associated with the one of the gaming machines.

8. A method operational on a gaming server, comprising:
   receiving, at the gaming server, one or more communication requests from one or more gaming machines, each communication request identifying a particular gaming machine requesting access to the gaming server;
   authenticating, at the gaming server, each of the requesting gaming machines;
   assigning, at the gaming server, a unique memory environment to each of the gaming machines that have been authenticated to the server;
   generating, at the gaming server, at least one respective random number for each of the unique memory environments;
   providing, at the gaming server, the at least one unique random number to each of the unique memory environments for use with a game application selected from among a number of available game applications; and
   periodically, at the gaming server, updating the at least one respective generated random number in each of the unique memory environments at an update rate;
   wherein, periodically updating the random numbers by:
       setting an upper update rate and a lower update rate based at least on data processing capability of the gaming machines; and
       modifying the update rate to stay within a range defined by the upper update rate and the lower update rate.

9. The method of claim 8, wherein assigning each of the unique memory environments to each of the gaming machines further comprises assigning at least one, respective seed value to each of the unique memory environments, the seed values for use in generating the at least one unique random number for each unique memory environment.

10. The method of claim 8, wherein periodically updating the random numbers further comprises:
   setting a target rate based at least on data processing capabilities of the gaming machines; and
   modifying the update rate to stay at or near the target rate.

* * * * *